May 21, 1940.  B. G. CARLSON  2,201,226
HYDRAULIC AUTOMATIC PILOT FOR AIRCRAFT
Filed March 24, 1938
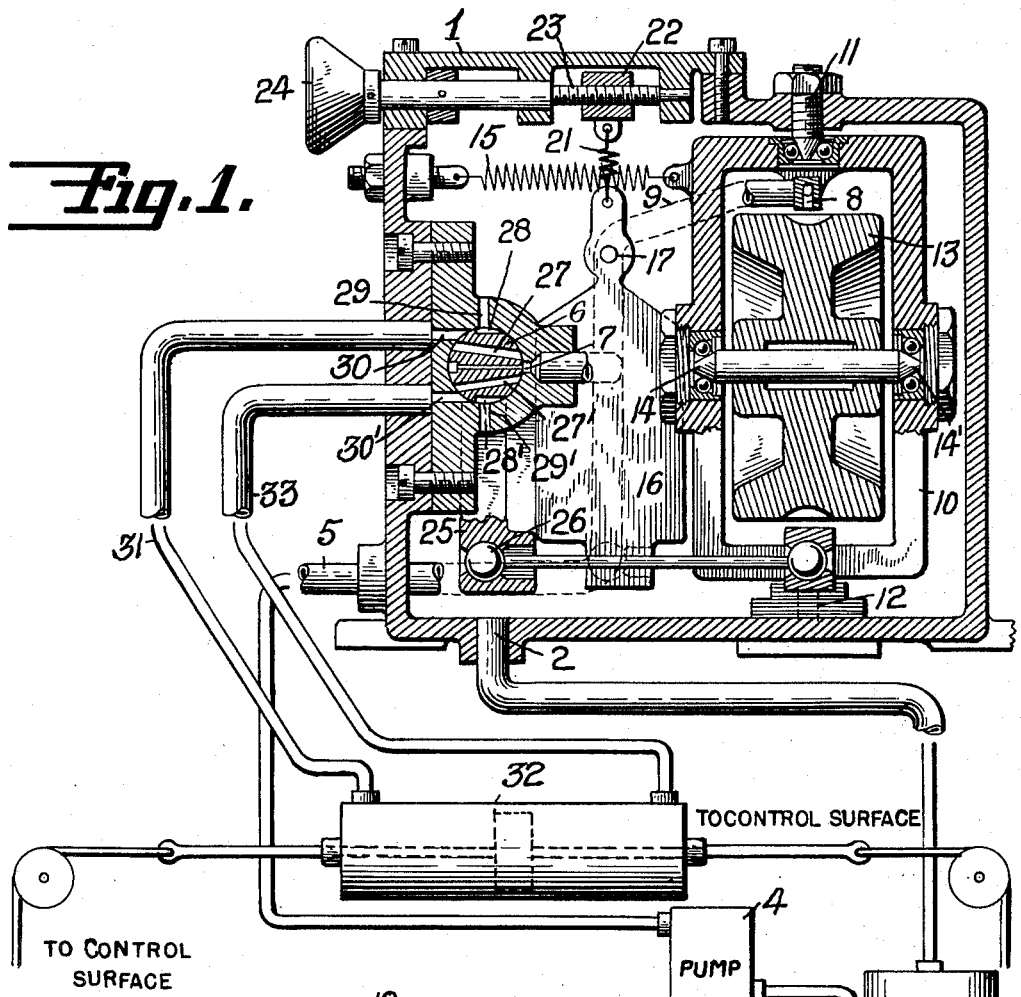
INVENTOR
BERT G. CARLSON
BY
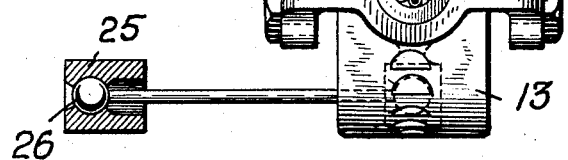
HIS ATTORNEY Patented May 21, 1940

2,201,226

UNITED STATES PATENT OFFICE 2,201,226

HYDRAULIC AUTOMATIC PILOT FOR AIRCRAFT

Bert G. Carlson, Freeport, N. Y., assignor to Sperry Gyroscope Company, Inc., Brooklyn, N. Y., a corporation of New York Application March 24, 1938, Serial No. 197,883

4 Claims. (Cl. 244—79)

This invention relates to a simple automatic pilot for aircraft. To simplify the disclosure, only one axis of control is shown, namely, for controlling the elevator, but my system is equally applicable to all three axes of control. According to my invention, I propose to employ as the controller a simple form of turn indicator type gyroscope, in which the spinning means and the pickoff and servo motor means are controlled from the same source of hydraulic pressure, such as an oil pump.

Referring to the drawing,

Fig. 1 is a vertical section of one unit of my controller, the connections to the servo motor being shown diagrammatically.

Fig. 2 is a plan view of the gyroscope as mounted within the container.

The control unit is shown as enclosed within an ail-tight container 1, from which the used oil is drained through outlet 2 into the sump 3. The oil pump 4 supplies continuous flow of oil under pressure, which enters the container through pipe 5 and passes both to the master control valve 6, and to the spinning nozzle 8 for the gyro wheel or rotor, the rotor thus being spun by a liquid jet after the manner of a Pelton wheel. The portion of the pipe 9 leading to the nozzle is of flexible construction so as to permit precession of the gyroscope.

The gyroscope is shown as comprising a rotor bearing frame 10 pivotally mounted in upper and lower pivots 11 and 12, and within which the rotor 13 is journalled in normally horizontal bearings 14 and 14'. The gyro is normally yieldingly centralized by tension spring 15 so that when the plane pitches upwardly or downwardly, the gyro will precess about its vertical axis 11, 12.

If desired, an additional centralizing means in the form of a pendulum 16 may be provided, which is pivoted at 17 and linked to the gyroscope to one side of its vertical axis through a link 18 having a ball and socket joint 19 with the pendulum and 20 with the gyro. The normal centralized position of the pendulum may be changed by a spring 21 connecting a point on the pendulum with the movable nut 22 at the top of the casing, the nut being threaded on threaded stem 23. By this means the trim of the craft may be readily adjusted by turning knob 24 on stem 23.

If the device is used to control the ailerons, the pendulum adjustment would govern the lateral tilt. The pendulum also would assist in causing automatic bank when the craft turns, since centrifugal force at that time would cause the pendulum to move the gyroscope to a new position against the action of spring 15 and thus turn valve 6 to bank the craft.

The master valve 6 is shown as globe valve from which depends a lever 25 connected at its lower end through a ball and socket linkage 26 with the gyroscope, so that the lever is pulled back and forth on its pivot when the gyroscope precesses. The pivot for the lever is formed by the rotatable globe portion 6' of the valve itself, the lever extending downwardly from the reduced end of the valve stem (not shown). The valve is shown as having two diverging channels 27, 27' extending therethrough, but neither of which connects with the port 7 in the centralized position. In this position, oil leaking between the valve walls will escape into cut-out portions 28 and 28' and thence outwardly into the case through ports 29 and 29'. When the valve is turned clockwise in Fig. 1, port 7 is put in communication with the port 30 connecting with a pipe 31 to lead oil under pressure into one side of the servo cylinder 32, while the return is effected through pipe 33 cut out 28' and port 29'. When the valve is turned counter-clockwise, the port 7 is connected with port 30' which supplies oil to pipe 33 to lead pressure oil into the oposite end of the servo cylinder to move the elevator up or down, as the case may be, to correct the tilt, the return being through pipe 31, cut out 28 and port 29. Servo-motor 32 is hence controlled directly from the gyroscope without the use of any relays or any other source of power other than a single oil pump.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. A hydraulic automatic pilot for aircraft comprising a turn responsive gyroscope, a source of liquid pressure, a normally centralized three position rotary valve actuated in one direction or the other by precession of said gyroscope away from its normal position, a reversible servo-motor for moving a control surface, supplied by liquid pressure from said valve, whereby said motor is stopped or actuated in either direction by said gyroscope, and combined spring and gravity responsive means for centralizing said gyroscope.

2. In automatic pilot for aircraft, a control surface, a spring restrained turn responsive gyroscope so mounted as to precess on pitch, a pendulum mounted to swing fore and aft, means connecting said gyroscope and pendulum for turning said gyroscope around its precession axis as said pendulum swings, means for shifting the neutral position of the pendulum to correct the trim of said craft, a reversible, normally locked hydraulic servo motor for moving said surface, and a valve actuated by the turning of said gyro for controlling said servo motor.

3. In an automatic pilot for aircraft, a control surface, a spring restrained turn responsive gyroscope so mounted as to precess on bank, a pendulum mounted to swing laterally, means connecting said gyroscope and pendulum for turning said gyroscope around its precession axis as said pendulum swings, means for shifting the neutral position of the pendulum to correct the trim of said craft, a reversible, normally locked hydraulic servo-motor for moving said surface, and a valve actuated by the turning of said gyro for controlling said servo-motor.

4. In an automatic stabilizer for aircraft, a spring restrained turn responsive gyroscope so mounted as to precess on bank, a pendulum mounted to swing laterally and means connecting said gyroscope and pendulum to turn the former around its precession axis, whereby said pendulum during a turn displaces said gyroscope and causes automatic banking.

BERT G. CARLSON.